US011666975B2

(12) United States Patent
Sambhy et al.

(10) Patent No.: US 11,666,975 B2
(45) Date of Patent: Jun. 6, 2023

(54) THREE-DIMENSIONAL PRINTER WITH NITROGEN ATMOSPHERE

(71) Applicant: XEROX CORPORATION, Norwalk, CT (US)

(72) Inventors: Varun Sambhy, Pittsford, NY (US); George Shannon, Fairport, NY (US); Santokh S. Badesha, Pittsford, NY (US)

(73) Assignee: XEROX CORPORATION, Norwalk, CT (US)

(*) Notice: Subject to any disclaimer, the term of this patent is extended or adjusted under 35 U.S.C. 154(b) by 267 days.

(21) Appl. No.: 17/109,800

(22) Filed: Dec. 2, 2020

(65) Prior Publication Data

US 2022/0168817 A1  Jun. 2, 2022

(51) Int. Cl.
| | |
|---|---|
| *B22F 12/70* | (2021.01) |
| *B33Y 30/00* | (2015.01) |
| *B33Y 10/00* | (2015.01) |
| *B22D 23/00* | (2006.01) |
| *B22F 10/22* | (2021.01) |
| *B22F 12/53* | (2021.01) |
| *B33Y 40/00* | (2020.01) |

(52) U.S. Cl.
CPC ............ *B22F 12/70* (2021.01); *B22D 23/003* (2013.01); *B22F 10/22* (2021.01); *B22F 12/53* (2021.01); *B33Y 10/00* (2014.12); *B33Y 30/00* (2014.12); *B33Y 40/00* (2014.12); *B22F 2201/02* (2013.01)

(58) Field of Classification Search
CPC .......... B22F 12/70; B22F 12/53; B22F 10/22; B22F 2201/02; B33Y 10/00; B33Y 30/00; B33Y 40/00; B22D 23/00
See application file for complete search history.

(56) References Cited

U.S. PATENT DOCUMENTS

| | | | | |
|---|---|---|---|---|
| 4,931,070 A | * | 6/1990 | Prasad ................ | B01D 53/226 95/52 |
| 2019/0351488 A1 | | 11/2019 | Vader et al. | |
| 2019/0375003 A1 | * | 12/2019 | Mark .................... | B22D 11/01 |

* cited by examiner

*Primary Examiner* — Anthony J Zimmer
*Assistant Examiner* — Ricardo D Morales
(74) *Attorney, Agent, or Firm* — MH2 Technology Law Group LLP

(57) ABSTRACT

A three-dimensional (3D) printer includes an ejector having a nozzle. The 3D printer also includes a heating element configured to heat a solid metal in the ejector, thereby causing the solid metal to change to a liquid metal within the ejector. The 3D printer also includes a coil wrapped at least partially around the ejector. The 3D printer also includes a power source configured to supply one or more pulses of power to the coil, which cause one or more drops of the liquid metal to be jetted out of the nozzle. The 3D printer also includes a substrate configured to support the one or more drops as the one or more drops solidify to form a 3D object. The 3D printer also includes a gas source configured to cause an oxygen concentration to be less than about 5% proximate to the one or more drops, the 3D object, or both.

22 Claims, 3 Drawing Sheets

THREE-DIMENSIONAL PRINTER WITH NITROGEN ATMOSPHERE

TECHNICAL FIELD

The present teachings relate generally to three-dimensional (3D) printing and, more particularly, to systems and methods for controlling an atmosphere around a metallic 3D object while the metallic 3D object is being printed by a 3D printer.

BACKGROUND

A 3D printing process builds a 3D object from a computer-aided design (CAD) model, usually by successively depositing material layer upon layer. For example, a first layer may be deposited upon a substrate, and then a second layer may be deposited upon the first layer. One particular type of 3D printer is a magnetohydrodynamic (MHD) printer, which is suitable for jetting liquid metal and its alloys layer upon layer to form a 3D metallic object.

The liquid metal is jetted out through a nozzle of the 3D printer onto the substrate or the previously deposited layer of metal. Once the liquid metal leaves the nozzle, the atmosphere around the falling liquid metal drop may include oxygen, which oxidizes the falling liquid metal drop, forming a passivated layer of metal oxide that can be significant if temperature and oxygen availability are high. 3D printing using drop-on-demand technology depends on the formation of a metallurgical bond between the current drop and the previously placed drop to build a solid metallic 3D object that has the expected properties of the metal alloy used as input. Significant oxide layers will reduce the expected mechanical properties, making the 3D object unfit for practical use.

SUMMARY

The following presents a simplified summary in order to provide a basic understanding of some aspects of one or more embodiments of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

A three-dimensional (3D) printer is disclosed. The 3D printer includes an ejector having a nozzle. The 3D printer also includes a heating element configured to heat a solid metal in the ejector, thereby causing the solid metal to change to a liquid metal within the ejector. The 3D printer also includes a coil wrapped at least partially around the ejector. The 3D printer also includes a power source configured to supply one or more pulses of power to the coil, which cause one or more drops of the liquid metal to be jetted out of the nozzle. The 3D printer also includes a substrate configured to support the one or more drops as the one or more drops solidify to form a 3D object. The 3D printer also includes a gas source configured to cause an oxygen concentration to be less than about 5% proximate to the one or more drops, the 3D object, or both.

In another implementation, the 3D printer includes an ejector having a nozzle. The 3D printer also includes a heating element configured to heat a solid aluminum in the ejector, thereby causing the solid aluminum to change to a liquid aluminum within the ejector. The 3D printer also includes a coil wrapped at least partially around the ejector. The 3D printer also includes a power source configured to supply one or more pulses of power to the coil, which cause one or more drops of the liquid aluminum to be jetted out of the nozzle. The 3D printer also includes a substrate configured to have the one or more drops land thereon. The one or more drops solidify on the substrate to form a 3D object. The 3D printer also includes an enclosure having the nozzle and the substrate positioned therein. The 3D printer also includes a membrane nitrogen generator configured to introduce a first gas into the enclosure. The first gas has a nitrogen concentration that is from about 90% to about 99.5%. Introducing the first gas into the enclosure causes the nitrogen concentration in the enclosure to increase until the nitrogen concentration is from about 90% to about 99.5% within the enclosure. Introducing the first gas into the enclosure causes an oxygen concentration in the enclosure to decrease until the oxygen concentration is from about 0.5% to about 5% within the enclosure, which reduces an amount of aluminum oxide that forms on the 3D object.

A method for printing a three three-dimensional (3D) object using a 3D printer is also disclosed. The method includes jetting one or more drops of a liquid metal through a nozzle of the 3D printer. The one or more drops land on a substrate. The one or more drops cool and solidify to form the 3D object. The method also includes moving the substrate while the one or more drops are jetted. The method also includes introducing a first gas into an enclosure, which causes an oxygen concentration within the enclosure to decrease and be from about 0.5% to about 5%. The nozzle, the substrate, the one or more drops, and the 3D object are positioned within the enclosure.

BRIEF DESCRIPTION OF THE DRAWINGS

The accompanying drawings, which are incorporated in and constitute a part of this specification, illustrate embodiments of the present teachings and together with the description, serve to explain the principles of the disclosure. In the figures.

DETAILED DESCRIPTION

Reference will now be made in detail to exemplary embodiments of the present teachings, examples of which are illustrated in the accompanying drawings. Wherever possible, the same reference numbers will be used throughout the drawings to refer to the same, similar, or like parts.

Figure 1:
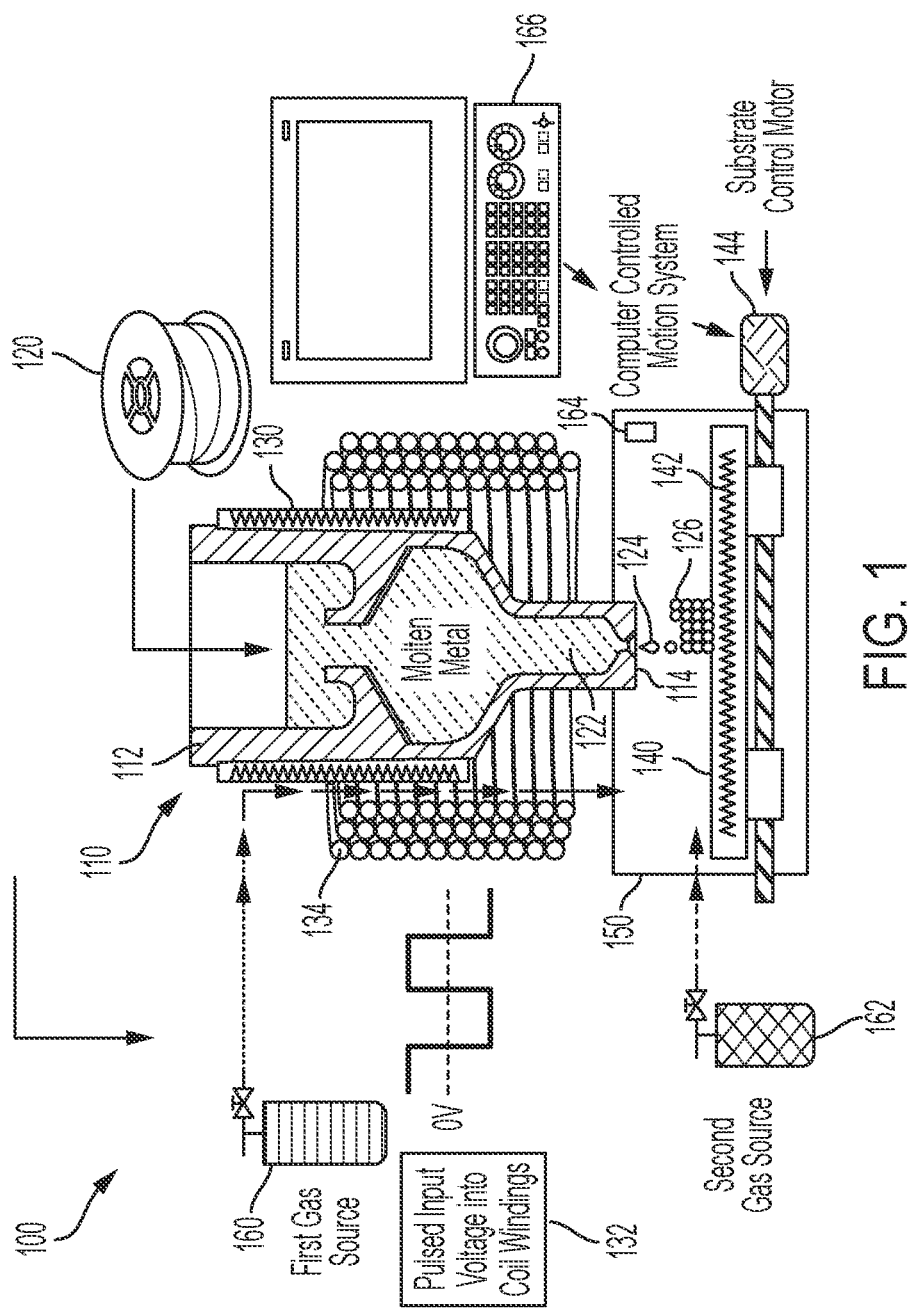
FIG. 1 depicts a schematic cross-sectional view of a 3D printer, according to an embodiment.

FIG. 1 depicts a schematic cross-sectional view of a 3D printer 100, according to an embodiment. The 3D printer 100 may include an ejector (also referred to as a pump chamber) 110. The ejector 110 may define an inner volume that is configured to receive a printing material 120. The printing material 120 may be or include a metal, a polymer, or the like. For example, the printing material 120 may be or include aluminum. In the embodiment shown, the printing material 120 is a spool of aluminum wire.

The 3D printer 100 may also include one or more heating elements 130. The heating elements 130 are configured to melt the printing material 120 within the inner volume of the ejector 110, thereby converting the printing material 120 from a solid material to a liquid material (e.g., liquid metal) 122 within the inner volume of the ejector 110.

The 3D printer 100 may also include a power source 132 and one or more metallic coils 134. The metallic coils 134 are wrapped at least partially around the ejector 110 and/or the heating elements 130. The power source 132 may be coupled to the coils 134 and configured to provide an electrical current thereto. In one embodiment, the power source 132 may be configured to provide a step function direct current (DC) voltage profile (e.g., voltage pulses) to the coils 134, which may create an increasing magnetic field. The increasing magnetic field may cause an electromotive force within the ejector 110, that in turn causes an induced electrical current in the liquid metal 122. The magnetic field and the induced electrical current in the liquid metal 122 may create a radially inward force on the liquid metal 122, known as a Lorenz force. The Lorenz force creates a pressure at an inlet of a nozzle 114 of the ejector 110. The pressure causes the liquid metal 122 to be jetted through the nozzle 114 in the form of one or more drops 124.

The 3D printer 100 may also include a substrate (also referred to as a build plate) 140 that is positioned below the nozzle 114. The drops 124 that are jetted through the nozzle 114 may land on the substrate 140 and cool and solidify to produce a 3D object 126. The substrate 140 may include a heater 142 therein that is configured to increase the temperate of the substrate 140. The 3D printer 100 may also include a substrate control motor 144 that is configured to move the substrate 140 as the drops 124 are being jetted (i.e., during the printing process) to cause the 3D object 126 to have the desired shape and size. The substrate control motor 144 may be configured to move the substrate 140 in one dimension (e.g., along an X axis), in two dimensions (e.g., along the X axis and a Y axis), or in three dimensions (e.g., along the X axis, the Y axis, and a Z axis). In another embodiment, the ejector 110 and/or the nozzle 114 may be also or instead be configured to move in one, two, or three dimensions.

The 3D printer 100 may also include an enclosure 150. The enclosure 150 may be positioned at least partially around the ejector 110, the nozzle 114, the drops 124, the 3D object 126, the heating elements 130, the coils 134, the substrate 140, or a combination thereof. In the embodiment shown, the heating elements 130, the coils 134, or both may be positioned outside (e.g., above) the enclosure 150, and the nozzle 114, the drops 124, the 3D object 126, and the substrate 140 may be positioned inside the enclosure 150. In one embodiment, the enclosure 150 may be hermetically sealed. In another embodiment, the enclosure 150 may not be hermetically sealed. In other words, the enclosure 150 may have one or more openings that may allow gas to flow therethrough. For example, the gas may flow out of the enclosure 150 through the openings.

The 3D printer 100 may also include one or more gas sources (two are shown: 160, 162). The gas sources 160, 162 may be positioned outside of the enclosure 150 and configured to introduce gas into the enclosure 150. The first gas source 160 may be configured to introduce a first gas that flows (e.g., downward) around the ejector 110, the nozzle 114, the heating elements 130, or a combination thereof. The first gas may flow around and/or within the coils 134. The first gas may flow into the enclosure 150 and/or proximate to (e.g., around) the drops 124, the 3D object 126, and/or the substrate 140.

The first gas may be or include an inert gas, such as helium, neon, argon, krypton, and/or xenon. The concentration of inert gas (e.g., argon) in the first gas may be from about 80% to about 99.5%, about 90% to about 99.5%, or about 95% to about 99.5%. The concentration of the first gas in the enclosure 150 may be from about 1% to about 5%, about 5 to about 10%, or about 10% to about 20%. In another implementation, the concentration of the first gas in the enclosure 150 may be from about 80% to about 99.5%, about 90% to about 99.5%, or about 95% to about 99.5%. The concentration of the first gas proximate to the drops 124, the 3D object 126, and/or the substrate 140 (e.g., in an embodiment where the enclosure 150 is omitted) may be from about 1% to about 5%, about 5 to about 10%, or about 10% to about 20%, about 80% to about 99.5%, about 90% to about 99.5%, or about 95% to about 99.5%. As used herein, "proximate to" refers to within about 5 cm or less, within about 3 cm or less, or within about 1 cm or less (e.g., as measured by a sensor).

The second gas source 162 may be configured to introduce a second gas into the enclosure 150. In one embodiment, the second gas source 162 may be or include a nitrogen membrane generator or a nitrogen tank, and the second gas may be or include nitrogen. In another embodiment, the second gas may also or instead be argon or helium. The second gas may flow into the enclosure 150 and/or proximate to (e.g., around) the drops 124, the 3D object 126, and/or the substrate 140. The concentration of nitrogen in the second gas may be from about 80% to about 99.5%, about 90% to about 99.5%, or about 95% to about 99.5%. The concentration of the second gas in the enclosure 150 may be from about 80% to about 99.5%, about 90% to about 99.5%, or about 95% to about 99.5%. The concentration of the second gas proximate to the drops 124, the 3D object 126, and/or the substrate 140 (e.g., in an embodiment where the enclosure 150 is omitted) may be from about 80% to about 99.5%, about 90% to about 99.5%, or about 95% to about 99.5%.

The introduction of the first gas and/or the second gas into the enclosure 150 may cause at least a portion of the air in the enclosure 150 to flow out of the enclosure 150 through the openings in the enclosure 150. In other words, at least a portion of the air may be purged. Thus, the concentration of the first gas and/or the second gas in the enclosure 150 may increase, and the concentration of air in the enclosure 150 may decrease. For example, the introduction of the first gas and/or the second gas into the enclosure 150 may cause the concentration of oxygen in the enclosure 150 to decrease into the following range: from about 0.1% to about 10%, about 0.5% to about 5%, or about 1% to about 4%. The introduction of the first gas and/or the second gas may cause the concentration of oxygen proximate to the drops 124, the 3D object 126, and/or the substrate 140 (e.g., in an embodiment where the enclosure 150 is omitted) to decrease into the following range: from about 0.1% to about 10%, about 0.5% to about 5%, or about 1% to about 4%. As a result, the introduction of the first gas (e.g., argon) and/or the second gas (e.g., nitrogen) may reduce/prevent the formation of oxide (e.g., aluminum oxide) on the drops 124 and/or the 3D object 126.

The 3D printer 100 may also include a gas sensor 164. The gas sensor 164 may be positioned within the enclosure 150. The gas sensor 160 may also or instead be positioned proximate to the drops 124, the 3D object 126, and/or the substrate 140 (e.g., in an embodiment where the enclosure 150 is omitted). The gas sensor 164 may be configured to measure a concentration of the first gas, the second gas, oxygen, or a combination thereof.

The 3D printer 100 may also include a computing system 166. The computing system 166 may be configured to control the introduction of the printing material 120 into the ejector 110, the heating elements 130, the power source 132, the substrate control motor 144, the first gas source 160, the second gas source 162, the gas sensor 164, or a combination thereof. For example, the computing system 166 may be configured to receive the measurements from the gas sensor 164, and also configured to control the first gas source 160 and/or the second gas source 162, based at least partially upon the measurements from the gas sensor 164. This may facilitate obtaining a predetermined concentration of the first gas, the second gas, oxygen, or a combination thereof within the enclosure 150. This may also or instead facilitate obtaining a predetermined concentration of the first gas, the second gas, oxygen, or a combination thereof proximate to the drops 124, the 3D object 126, and/or the substrate 140 (e.g., in an embodiment where the enclosure 150 is omitted).

Figure 2:
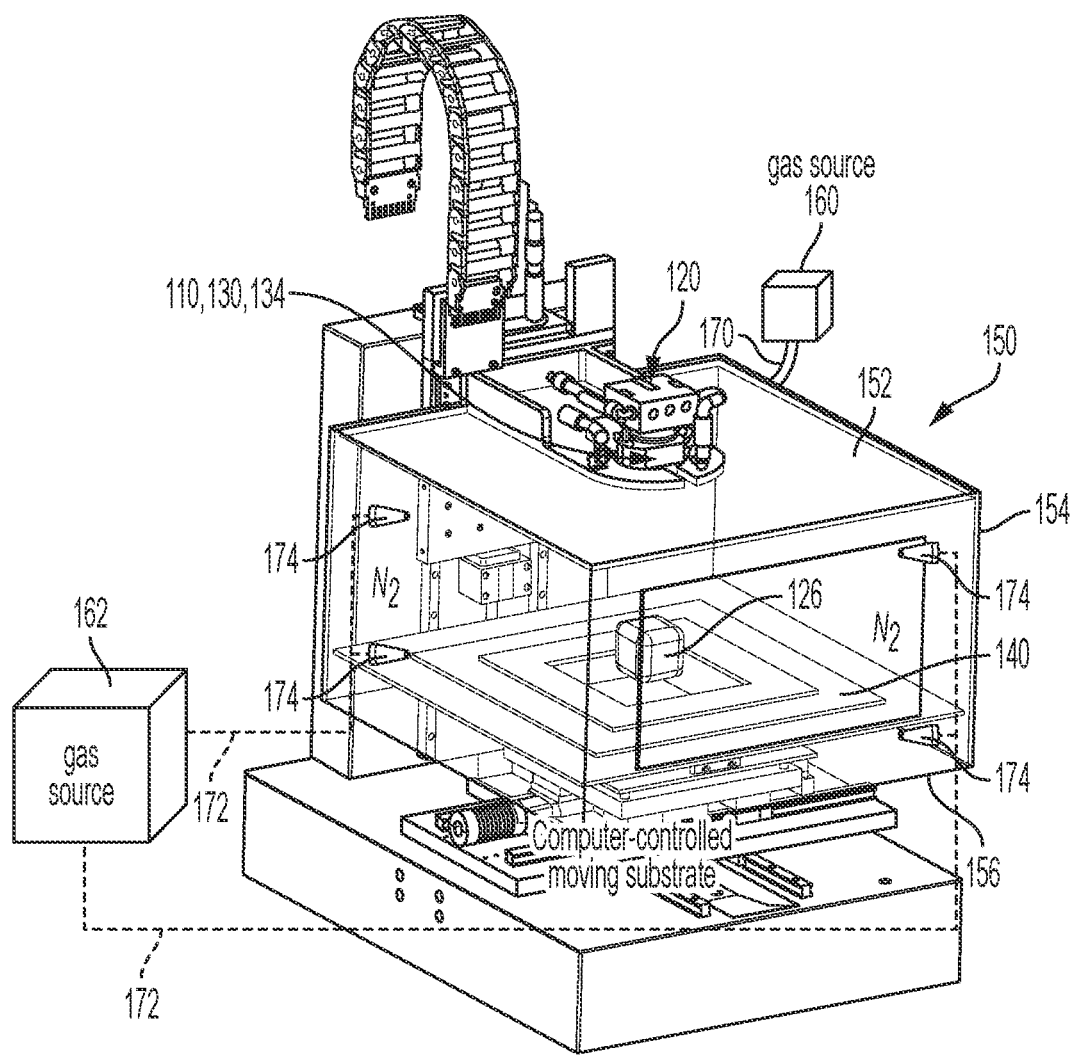
FIG. 2 depicts a perspective view of the 3D printer, according to an embodiment.

FIG. 2 depicts a perspective view of the 3D printer 100, according to an embodiment. As shown, at least a portion of the ejector 110 may extend through an upper wall 152 of the enclosure 150. More particularly, the heating elements 130, the coils 134, or both may be positioned outside of the enclosure 150 (e.g., above the upper wall 152). Although not shown in FIG. 2, the nozzle 114 may be positioned inside the enclosure 150 (e.g., below the upper wall 152). The substrate 140 may also be positioned inside the enclosure 150. The substrate control motor 144 may be configured to cause the substrate 140 to move in one, two, or three dimensions within the enclosure 150.

The first gas source 160 may be positioned outside of the enclosure 150, but may include one or more lines 170 that extend through the enclosure 150 to introduce the second gas into the enclosure 150. As shown, the line 170 may extend through an upper wall 152 of the enclosure 150 and direct the first gas downward toward the substrate 140. The second gas source 162 may be positioned outside of the enclosure 150, but may include one or more lines 172 that extend through the enclosure 150 to introduce the second gas into the enclosure 150. As shown, the lines 172 may extend through one or more side walls 154 of the enclosure 150 and direct the second gas in a substantially horizontal direction toward the falling drops 124 and/or the stream of the first gas (e.g., argon). The second gas may be introduced at one or more elevations within the enclosure 150. As shown, the second gas may be introduced into the enclosure 150 at a first (e.g., lower) elevation and a second (e.g., upper) elevation. Although not shown, the lines 172 may also or instead extend through the upper wall 152 and/or a lower wall 156 of the enclosure 150.

In one embodiment, the lines 172 of the second gas source 162 may include nozzles 174 that are configured to direct the second gas toward the drops 124, the 3D object 126, the substrate 140, or a combination thereof. For example, a first of the nozzles 174 may direct the second gas toward the nozzle 114, a second of the nozzles 174 may direct the second gas toward the falling drops 124 (e.g., between the nozzle 114 and the substrate 140), a third of the nozzles 174 may direct the second gas toward the 3D object 126, and a fourth of the nozzles 174 may direct the second gas toward the substrate 140. The second gas source 162 and/or the nozzles 174 may be configured to introduce the second gas at a flow rate from about 0.1 ml/min to about 1000 ml/min, about 1 ml/min to about 500 ml/min, or about 10 ml/min to about 100 ml/min. The nozzles 174 may be adjustable to adjust the direction that the second gas is directed. In one example, the nozzles 174 may be manually adjustable (e.g., loc line modular type). In another example, the nozzles 174 may be adjusted by the computing system 166 and/or a motor.

Figure 3:
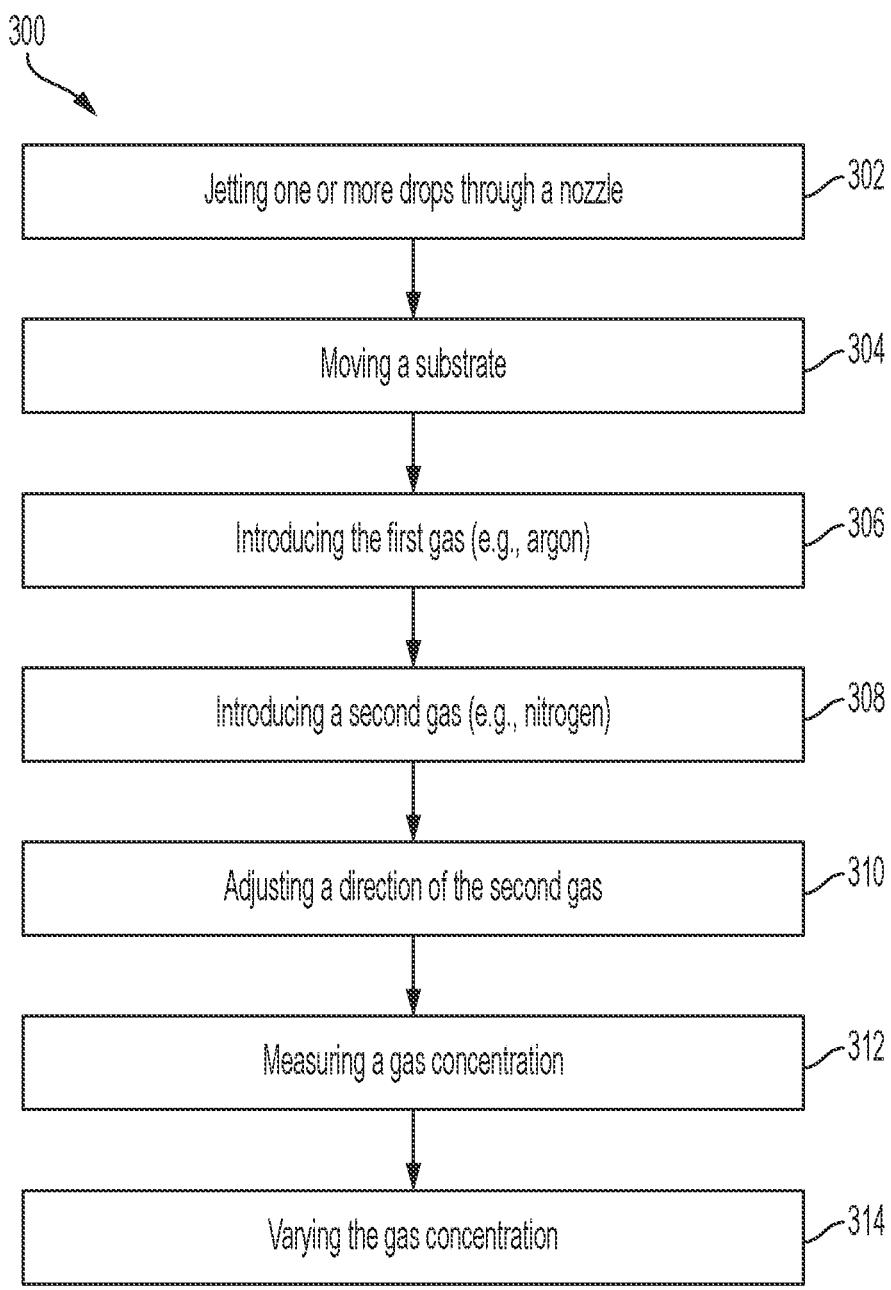
FIG. 3 illustrates a flowchart of a method for printing a 3D object using the 3D printer, according to an embodiment.

FIG. 3 illustrates a flowchart of a method 300 for printing the 3D object 126 using the 3D printer 100, according to an embodiment. An illustrative order of the method 300 is provided below. One or more steps of the method 300 may be performed in a different order, performed simultaneously, repeated, or omitted.

The method 300 may include jetting one or more drops of liquid material 124 through the nozzle 114, as at 302. As discussed above, the power source 132 may provide one or more pulses of power to the coils 134 to cause the drop(s) of the liquid material 124 to pass through the nozzle 114 and descend toward the substrate 140. The liquid material may be or include liquid metal (e.g., aluminum).

The method 300 may also include moving the substrate 140, as at 304. More particularly, the substrate 140 may move in one, two, or three dimensions simultaneously with the drops 124 being jetted so that the drops 124 land in the desired locations to form the 3D object 126. In another embodiment, the ejector 110 and/or the nozzle 114 may move instead of or in addition to the substrate 140.

The method 300 may also include introducing the first gas (e.g., argon) into the enclosure 150, as at 306. This may also or instead include directing the first gas toward the nozzle 114, the drops 124, the 3D object 126, the substrate 140, or a combination thereof. This may increase the concentration of the first gas within the enclosure 150 and/or proximate to the nozzle 114, the drops 124, the 3D object 126, the substrate 140, or a combination thereof. This may also decrease the concentration of oxygen within the enclosure 150 and/or proximate to the nozzle 114, the drops 124, the 3D object 126, the substrate 140, or a combination thereof. Decreasing the concentration of oxygen may reduce/prevent the formation of oxide (e.g., aluminum oxide) on the drops 124 and/or the 3D object 126.

The method 300 may also include introducing the second gas (e.g., nitrogen) into the enclosure 150, as at 308. This may also or instead include directing the second gas toward the nozzle 114, the drops 124, the 3D object 126, the substrate 140, or a combination thereof. This may increase the concentration of the second gas within the enclosure 150 and/or proximate to the nozzle 114, the drops 124, the 3D object 126, the substrate 140, or a combination thereof. This may also decrease the concentration of oxygen within the enclosure 150 and/or proximate to the nozzle 114, the drops 124, the 3D object 126, the substrate 140, or a combination thereof. Decreasing the concentration of oxygen may reduce/prevent the formation of oxide (e.g., aluminum oxide) on the drops 124 and/or the 3D object 126.

The method 300 may also include adjusting a direction of the second gas, as at 310. This may include manually or automatically (e.g., using the computing system 166) adjusting a direction of the nozzles 174. The direction may be adjusted during printing (e.g., while the drops 124 are jetted), or during pauses in the printing. For example, as the 3D object 126 is being printed, the direction of the second gas may be adjusted to direct the second gas to the portions of the 3D object 126 that are still at least partially in the liquid phase (e.g., before they solidify). In another example, as the 3D object 126 is being printed, the direction of the second gas may be adjusted to direct the second gas to the location on the 3D object 126 (or the substrate 140) where the drops 124 land, which may continue to change/move throughout the printing process as the 3D object 126 grows in size.

The method 300 may also include measuring a gas concentration, as at 312. This may include measuring a concentration of oxygen, the first gas, the second gas, or a combination thereof using the gas sensor 164. The concentration may be measured proximate to the drops 124, the 3D object 126, the substrate 140, or a combination thereof. The concentration may also or instead be measured within the enclosure 150.

The method 300 may also include varying the gas concentration, as at 314. The measured gas concentration may be transmitted to the computing system 166, and the computing system 160 may vary (e.g., increase or decrease) the flow rate of the first gas, the second gas, or both. This may vary the gas concentration proximate to the drops 124, the 3D object 126, the substrate 140, or a combination thereof. This may also or instead vary the gas concentration within the enclosure 150. This may be done to reduce the concentration of oxygen below a threshold to reduce/prevent the formation of oxide (e.g., aluminum oxide) on the drops 124 and/or the 3D object 126. The threshold may be about 10%, about 5%, or about 2%.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" may include any and all sub-ranges between (and including) the minimum value of zero and the maximum value of 10, that is, any and all sub-ranges having a minimum value of equal to or greater than zero and a maximum value of equal to or less than 10, e.g., 1 to 5.

While the present teachings have been illustrated with respect to one or more implementations, alterations and/or modifications may be made to the illustrated examples without departing from the spirit and scope of the appended claims. For example, it may be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects or embodiments of the present teachings. It may be appreciated that structural objects and/or processing stages may be added, or existing structural objects and/or processing stages may be removed or modified. Further, one or more of the acts depicted herein may be carried out in one or more separate acts and/or phases. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items may be selected. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "conformal" describes a coating material in which angles of the underlying material are preserved by the conformal material. The term "about" indicates that the value listed may be somewhat altered, as long as the alteration does not result in nonconformance of the process or structure to the illustrated embodiment. The terms "couple," "coupled," "connect," "connection," "connected," "in connection with," and "connecting" refer to "in direct connection with" or "in connection with via one or more intermediate elements or members." Finally, the terms "exemplary" or "illustrative" indicate the description is used as an example, rather than implying that it is an ideal. Other embodiments of the present teachings may be apparent to those skilled in the art from consideration of the specification and practice of the disclosure herein. It is intended that the specification and examples be considered as exemplary only, with a true scope and spirit of the present teachings being indicated by the following claims.

What is claimed is:

1. A three-dimensional (3D) printer, comprising:
   an ejector comprising a nozzle;
   a heating element configured to heat a solid metal in the ejector, thereby causing the solid metal to change to a liquid metal within the ejector;
   a coil wrapped at least partially around the ejector;
   a power source configured to supply one or more pulses of power to the coil, which cause one or more drops of the liquid metal to be jetted out of the nozzle;
   a substrate configured to support the one or more drops as the one or more drops solidify to form a 3D object;
   an enclosure having the nozzle and the substrate positioned therein;
   a first gas source configured introduce a first gas into the enclosure which causes an oxygen concentration in the enclosure to be less than about 5% proximate to the one or more drops, the 3D object, or both; and
   a second gas source configured to introduce a second gas into the enclosure, wherein the second gas is different than the first gas, and wherein the second gas comprises helium, neon, argon, krypton, xenon, or a combination thereof.

2. The 3D printer of claim 1, wherein the gas source is configured to direct the first gas toward the one or more drops, the 3D object, or both, and wherein the first gas has a nitrogen concentration that is from about 90% to about 99.5%.

3. The 3D printer of claim 2, wherein the first gas source comprises an adjustable nozzle that is configured to vary a direction that the first gas is directed.

4. The 3D printer of claim 3, wherein the adjustable nozzle is configured to cause the first gas to be directed toward the one or more drops, a portion of the 3D object that has not yet solidified, or both.

5. The 3D printer of claim 3, wherein the adjustable nozzle is configured to cause the first gas to be directed toward a location where the one or more drops land on the substrate, the 3D object, or both, and wherein the location varies as the 3D object is printed.

6. The 3D printer of claim 2, wherein the first gas source directing the first gas causes the nitrogen concentration to increase proximate to the one or more drops of the liquid metal, the 3D object, or both, which causes the concentration of oxygen to decrease proximate to the one or more drops of the liquid metal, the 3D object, or both.

7. The 3D printer of claim 6, wherein the first gas source directing the first gas causes the nitrogen concentration to be from about 90% to about 99.5% proximate to the one or more drops of the liquid metal, the 3D object, or both, and causes the oxygen concentration to be from about 0.5% to about 5% proximate to the one or more drops of the liquid metal, the 3D object, or both.

8. The 3D printer of claim 1, wherein the first gas has a nitrogen concentration that is from about 90% to about 99.5%, which causes the nitrogen concentration in the enclosure to be from about 90% to about 99.5%, which causes the oxygen concentration in the enclosure to be less than about 5%.

9. The 3D printer of claim 8, wherein the heating element, the coil, or both are not positioned within the enclosure.

10. The 3D printer of claim 1, wherein the first gas source comprises a membrane nitrogen generator.

11. A three-dimensional (3D) printer, comprising:
an ejector comprising a nozzle;
a heating element configured to heat a solid aluminum in the ejector, thereby causing the solid aluminum to change to a liquid aluminum within the ejector;
a coil wrapped at least partially around the ejector;
a power source configured to supply one or more pulses of power to the coil, which cause one or more drops of the liquid aluminum to be jetted out of the nozzle;
a substrate configured to have the one or more drops land thereon, wherein the one or more drops solidify on the substrate to form a 3D object;
an enclosure having the nozzle and the substrate positioned therein;
a membrane nitrogen generator configured to introduce a first gas into the enclosure, wherein the first gas has a nitrogen concentration that is from about 90% to about 99.5%, wherein introducing the first gas into the enclosure causes the nitrogen concentration in the enclosure to increase until the nitrogen concentration is from about 90% to about 99.5% within the enclosure, and wherein introducing the first gas into the enclosure causes an oxygen concentration in the enclosure to decrease until the oxygen concentration is from about 0.5% to about 5% within the enclosure, which reduces an amount of aluminum oxide that forms on the 3D object; and
an inert gas source that is configured to introduce a second gas into the enclosure, wherein the second gas is different than the first gas, and wherein the second gas comprises helium, neon, argon, krypton, xenon, or a combination thereof.

12. The 3D printer of claim 11, wherein the second gas has an inert concentration that is that is from about 90% to about 99.5%, wherein introducing the second gas into the enclosure causes the inert concentration to increase until the inert concentration is from about 1% to about 10% within the enclosure, and wherein introducing the first and second gases into the enclosure causes the oxygen concentration in the enclosure to decrease until the oxygen concentration is from about 0.5% to about 5% within the enclosure.

13. The 3D printer of claim 11, further comprising an adjustable nozzle that is configured to vary a direction that the first gas is directed such that the first gas is directed toward the one or more drops, a portion of the 3D object that has not yet solidified, or both.

14. The 3D printer of claim 11, further comprising an adjustable nozzle that is configured to vary a direction that the first gas is directed such that the first gas is directed toward a location where the one or more drops land on the substrate or the 3D object, and wherein the location varies as the 3D object is printed.

15. The 3D printer of claim 11, further comprising a sensor in the enclosure, wherein the sensor is configured to measure the nitrogen concentration in the enclosure, the oxygen concentration in the enclosure, or both, and wherein the membrane nitrogen generator is configured to vary a flow rate of the first gas into the enclosure in response to the nitrogen concentration, the oxygen concentration, or both.

16. The 3D printer of claim 11, wherein the first gas is directed in a substantially horizontal direction toward the one or more drops.

17. The 3D printer of claim 11, wherein the second gas is directed in a substantially downward direction toward the substrate.

18. The 3D printer of claim 11, wherein the first gas is introduced at a first elevation and a second elevation, and wherein the first elevation is above the second elevation.

19. The 3D printer of claim 11, further comprising a nozzle that is configured to direct a portion of the first gas toward the nozzle of the ejector.

20. The 3D printer of claim 11, further comprising a nozzle that is configured to direct a portion of the first gas toward the one or more drops.

21. The 3D printer of claim 11, further comprising a nozzle that is configured to direct a portion of the first gas toward the 3D object.

22. The 3D printer of claim 11, further comprising a nozzle that is configured to direct a portion of the first gas toward the substrate.

* * * * *